US012291299B2

United States Patent
Tseng et al.

(10) Patent No.: US 12,291,299 B2
(45) Date of Patent: May 6, 2025

(54) BICYCLE SAFETY SYSTEM

(71) Applicant: Dyaco International Inc., Taipei (TW)

(72) Inventors: Yu-Hsiang Tseng, Taipei (TW);
Hsin-Pao Lin, Changhua County (TW)

(73) Assignee: Dyaco International Inc., Taipei (TW)

( * ) Notice: Subject to any disclaimer, the term of this patent is extended or adjusted under 35 U.S.C. 154(b) by 159 days.

(21) Appl. No.: 18/234,743

(22) Filed: Aug. 16, 2023

(65) Prior Publication Data
US 2025/0058846 A1 Feb. 20, 2025

(30) Foreign Application Priority Data

Aug. 15, 2023 (TW) .................................. 112130701

(51) Int. Cl.
*B62J 50/22* (2020.01)
*B62J 45/20* (2020.01)
*B62J 45/41* (2020.01)
*G10K 9/20* (2006.01)

(52) U.S. Cl.
CPC ............... *B62J 50/22* (2020.02); *B62J 45/20* (2020.02); *B62J 45/41* (2020.02); *G10K 9/20* (2013.01)

(58) Field of Classification Search
None
See application file for complete search history.

(56) References Cited

FOREIGN PATENT DOCUMENTS

WO WO-2024259151 A2 * 12/2024

\* cited by examiner

*Primary Examiner* — K. Wong
(74) *Attorney, Agent, or Firm* — Donald E. Stout; Stout, Uxa & Buyan, LLP

(57) ABSTRACT

A safety system for bicycles includes a radar, a controller, and a warning apparatus, which includes a tube, a vibrating motor, and an impact sounder. The vibrating motor includes a rotary shaft and an eccentric block. The impact sounder includes an elastic member and an impact block. The elastic member includes a first end fixed to the inner wall of the tube and a second end connected to the impact block. When the controller decides to issue a warning based on a radar signal, it outputs a control signal to drive the rotary shaft to rotate. The rotation of the rotary shaft drives the eccentric block to rotate and vibrate, and the eccentric block strikes the impact sounder to make the impact block hit the inner wall and thus generate an impact force and emit a sound. The warning apparatus simultaneously provides the bicycle rider with vibrating, impacting, and audible warning.

10 Claims, 9 Drawing Sheets

BICYCLE SAFETY SYSTEM

CROSS-REFERENCE TO RELATED APPLICATIONS

The entire contents of Taiwan Patent Application No. 112130701, filed on Aug. 15, 2023, from which this application claims priority, are expressly incorporated herein by reference.

BACKGROUND OF THE INVENTION

1. Field of the Invention

The present invention relates to a safety system for bicycles.

2. Description of Related Art

Cycling not only is a great way to improve physical and mental health, but also a useful manner to protect the nature environment. However, bicycles often share the road with other vehicles, and inappropriate overtaking by vehicles coming from behind can be dangerous and cause cyclists to feel anxious and hence reduce the willingness to cycle on the road.

Many safety devices, such as reflective jackets, reflective strips, LED lights, etc., have been widely used to increase the safety of riding a bicycle. This type of safety device is not reliable because it merely increases the visibility of the bicycle and rider and lacks to provide immediate feedback on the approach of a nearby vehicle.

Because collision danger usually exists between a bike and a vehicle approaching from behind or side and the rider may be unaware of the approach prior to impact, there is a need for a safety system that automatically detects the situation between the bike and nearby vehicles. This system provides warnings to draw the rider's attention, thereby reducing the risk of the bicycle being impacted by a vehicle.

Some vendors have proposed bicycles with blind spot detection (BSD) radar. When the BSD radar detects that a vehicle is approaching, a vibrating motor inside a handlebar will warn the rider. However, the vibrating warning provided by the vibrating motor is weak, which may be confused with the vibration of the handlebar caused by the rough road, and a rubber handle outside the handlebar further reduces the intensity of the vibrating warning. In addition, the rider's hand may leave the rubber handle, resulting in no warning been received. To solve the above problems, a better bicycle safety system is required.

SUMMARY OF THE INVENTION

This summary is provided to introduce a selection of concepts in a simplified form that are further described below in the detailed description. This summary, and the foregoing background, is not intended to identify key aspects or essential aspects of the claimed subject matter. Moreover, this summary is not intended for use as an aid in determining the scope of the claimed subject matter.

In one aspect, a bicycle safety system is provided with a radar, a controller, and a warning apparatus. The radar detects a signal of one or more vehicles in a left blind spot and a right blind spot behind a bicycle. The controller receives the signal from the radar and determines whether to issue a warning based on the signal. The warning apparatus comprises a tube, a vibrating motor, and an impact sounder. The vibrating motor comprises a rotary shaft and an eccentric block connected to the rotary shaft, wherein the rotary shaft and the eccentric block are arranged inside the tube. The impact sounder comprises an elastic member and an impact block, wherein the elastic member comprises a first end fixed to an inner wall of the tube and a second end connected to the impact block. Wherein the controller outputs a control signal to drive the rotary shaft to rotate if the warning is needed to issue, the rotation of the rotary shaft drives the eccentric block to rotate and result in vibration, and the eccentric block hits the impact sounder, causing the impact block to hit the inner wall and thus create an impact force and emit a sound.

In some embodiments, the eccentric block hits and deforms the elastic member of the impact sounder, and the deformed elastic member causes the impact block to hit the inner wall to create the impact force and emit the sound.

In some embodiments, the eccentric block hits the impact block of the impact sounder and thus emits a first sound and deforms the elastic member, and the deformed elastic member causes the impact block to hit the inner wall to create the impact force and emit a second sound.

In some embodiments, the number of the impact sounder is plural.

In some embodiments, dimensions of the impact blocks and/or dimensions of the elastic members of the plurality of impact sounders are different from one another.

In some embodiments, the elastic member is a spring clip.

In some embodiments, the impact sounder is a steel ball.

In some embodiments, the inner wall comprises a rough surface.

In some embodiments, the tube comprises one or more perforations.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

DETAILED DESCRIPTION OF THE PREFERRED EMBODIMENT

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
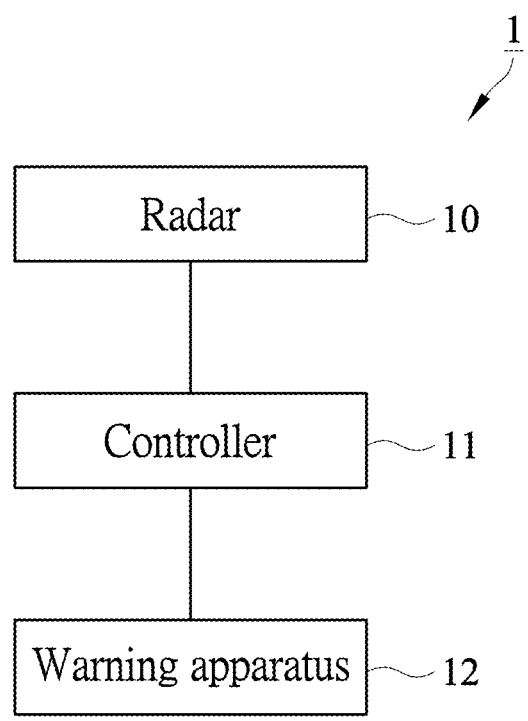
FIG. 1 is a block diagram showing a bicycle safety system in accordance with an embodiment of the invention.
Figure 2:
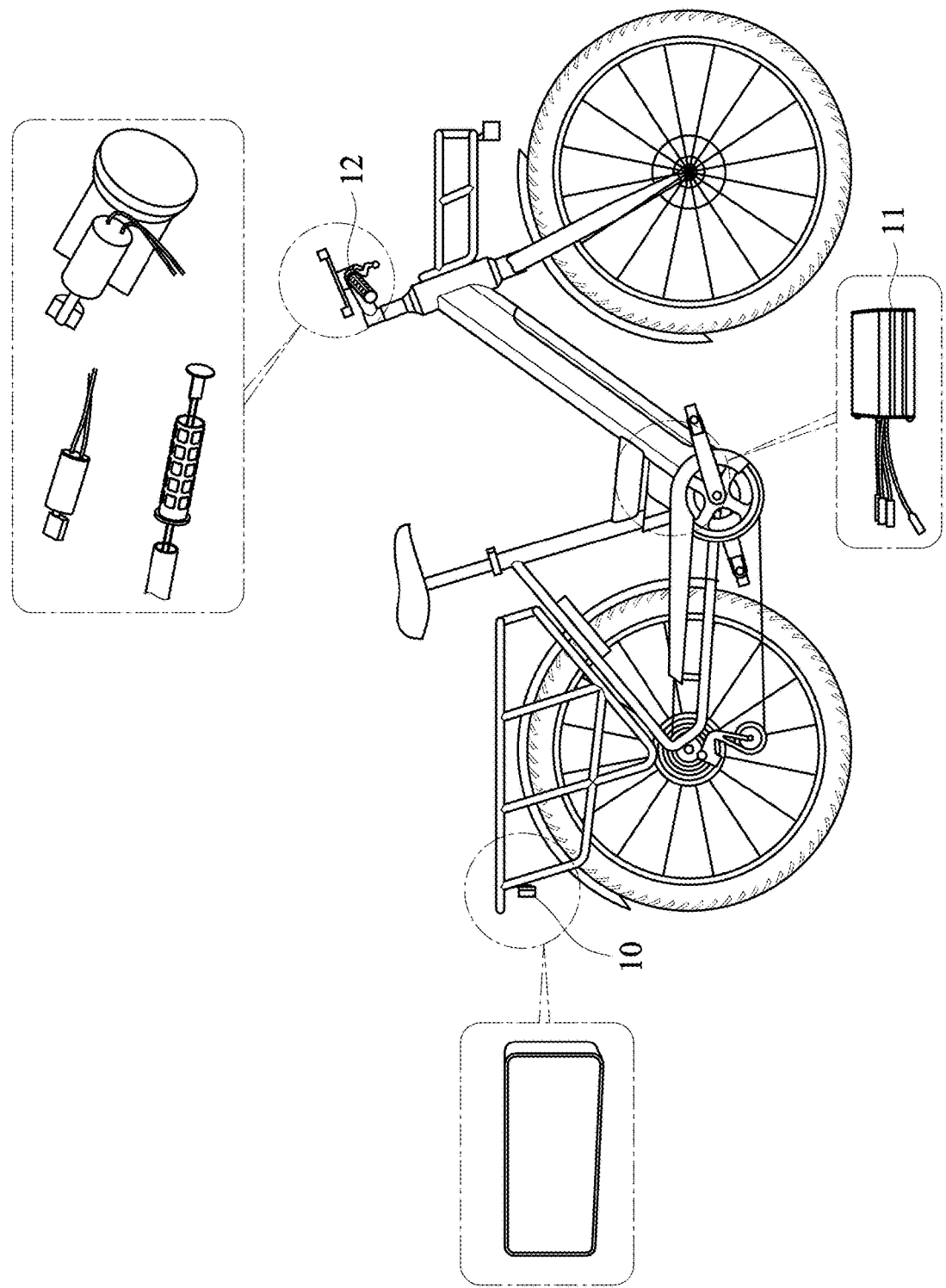
FIG. 2 is a schematic diagram showing a bicycle installed with the bicycle safety system of FIG. 1.

FIG. 1 is a block diagram showing a bicycle safety system in accordance with an embodiment of the invention. FIG. 2 is a schematic diagram showing a bicycle installed with the bicycle safety system of FIG. 1. Referring to FIGS. 1 and 2, the bicycle safety system 1 is adapted to be installed on a bicycle and mainly includes a radar 10, a controller 11, and a warning apparatus 12. In this text, "bicycle" typically refers to a two-wheeled vehicle driven entirely by human power, or a two-wheeled vehicle with electric auxiliary drive, such as an electric bicycle (e-bike).

Referring to FIG. 1 and FIG. 2, the radar 10 is arranged at an appropriate position in front or rear of the bicycle, such as a supporting structure of a rear seat. The radar 10 can be a blind spot detection (BSD) radar commonly used in automobiles, continuously detecting one or more parameters of one or more vehicles (such as automobiles or motorcycles, etc.) in the left and right blind spots behind the bicycle—e.g., a distance between a vehicle and the bicycle, a speed of the vehicle, etc.

Referring to FIGS. 1 and 2, the controller 11 is arranged at an appropriate position of the bicycle, such as a frame, and receives signals from the radar 10. Preferably, the controller 11 and the radar 10 are electrically connected to transmit data through wires. The controller 11 may include a battery or may be connected to an external power source. The controller 11 determines whether to issue a warning according to the signal from the radar 10. When it is necessary to issue a warning, the controller 11 outputs a control signal to drive the warning apparatus 12 to issue a warning. The details will be described in detail below.

Figure 3A:
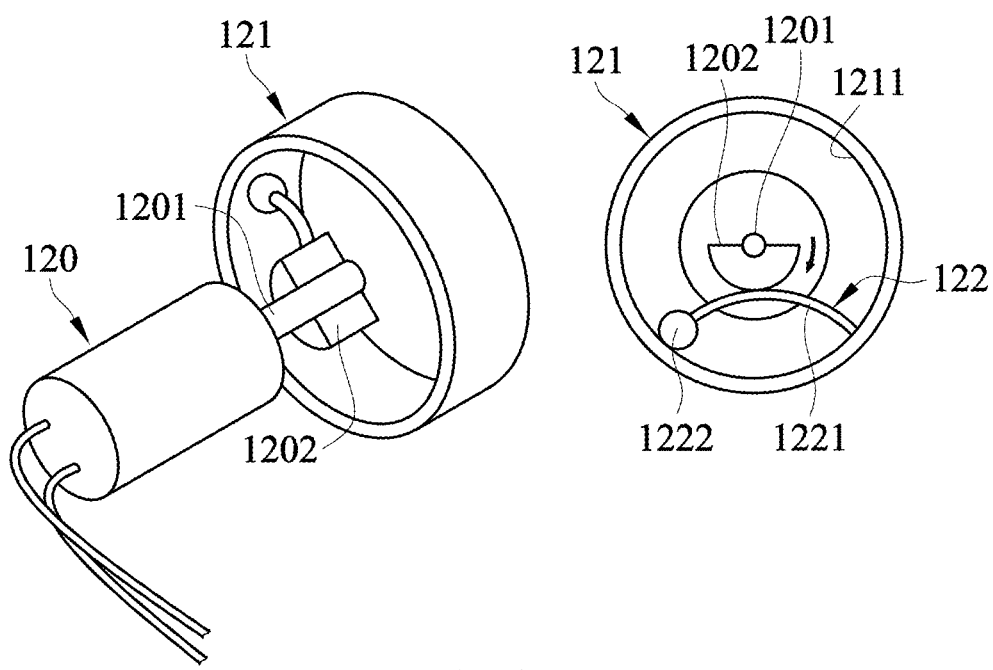
FIG. 3A and FIG. 3B are schematic diagrams showing a warning apparatus according to a preferred embodiment of the invention.
Figure 3B:
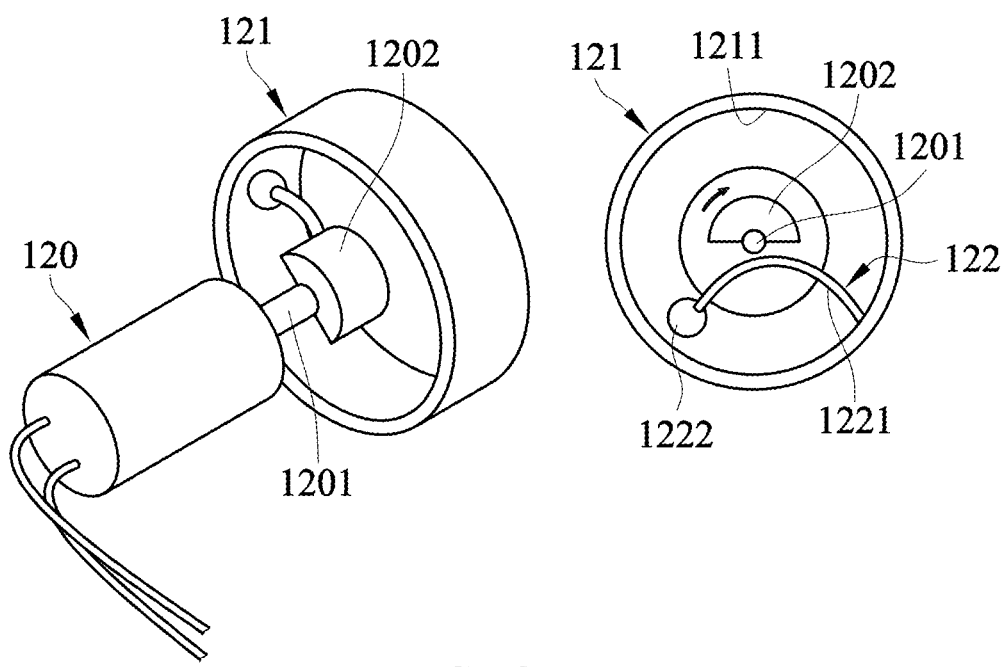

FIG. 3A and FIG. 3B are schematic diagrams showing a warning apparatus 12 according to a preferred embodiment of the invention. Referring to FIG. 3A, the warning apparatus 12 mainly includes a vibrating motor 120, a tube 121, and an impact sounder 122. The vibrating motor 120 mainly includes a rotary shaft 1201 and an eccentric block 1202 connected to the rotary shaft 1201. Preferably, the rotary shaft 1201 and the eccentric block 1202 are arranged inside the tube 121. The impact sounder 122 mainly includes an elastic member 1221 and an impact block 1222. The elastic member 1221 includes a first end fixed to an inner wall 1211 of the tube 121 and a second end connected to the impact block 1222. The first end of the elastic member 1221 can be fixed to the inner wall 1211 by welding, screwing, or other manners known in the art. Initially the elastic member 1221 is not subjected to an external force, and the impact block 1222 does not contact the inner wall 1211 of the tube 121. In the exemplary embodiment, the elastic member 1221 is, but not limited to, a spring clip. Preferably, the tube 121, the eccentric block 1202, the elastic member 1221, and the impact block 1222 are made of metal or alloy. The elastic member 1221 and the impact block 1222 may be made of same or different materials. In some embodiments, the eccentric block 1202 is made of a non-metal material, such as a polymer.

Referring to FIG. 3A, when a warning is required, the controller 11 outputs a control signal to drive the rotary shaft 1201 of the vibrating motor 120 to rotate. The rotation of the rotary shaft 1201 drives the eccentric block 1202 to rotate, resulting in vibration caused by inertia. In addition, as shown in FIG. 3A, when the rotary shaft 1201 rotates to drive the eccentric block 1202 to rotate, the eccentric block 1202 strikes and hence deforms the elastic member 1221, causing the impact block 1222 at the second end (free end) of the elastic member 1221 to hit the inner wall 1211 of the tube 121 and thus create an impact force and produce a sound. The vibration, impact force, and sound are conducted through the tube 121 to warn the rider. Referring to FIG. 3B, when the eccentric block 1202 is rotated to a certain orientation, the eccentric block 1202 separates from the elastic member 1221, and the impact block 1222 returns to its initial position, i.e., the position that the impact block 1222 does not contact the inner wall 1211 of the tube 121. If the rotation speed of the rotary shaft 1201 is constant during the rotation of the rotary shaft 1201, the impact block 1222 periodically impacts the inner wall 1211 of the tube 121 to generate the impact force and sound periodically.

Referring to FIGS. 3A and 3B, preferably, the controller 11 and the vibrating motor 120 are electrically connected to transmit data through wires. According to the exemplary embodiment, the warning apparatus 12 simultaneously provides three types of waring-vibrating, impacting, and audible warning. In this article, the "sound" emitted by the warning apparatus 12 is a sound wave with an outdoor ambient sound pressure greater than a certain value, such as 75 dB. According to the distance between the vehicle and the bicycle, the controller 11 can divide the degree of warning into several, e.g., three levels. The rotating speed of the rotary shaft 1201 may be different according to the level of the warning, e.g. —the closer the distance between the vehicle and the bicycle, the faster the rotational speed of the rotary shaft 1201.

Referring to FIGS. 3A and 3B, in the exemplary embodiment, the tube 121 is a part or a portion of a handlebar of the bicycle. As a result, the vibrating motor 120 and the impact sounder 122 are disposed inside the handlebar. The vibration and impact force generated by the warning apparatus 12 are conducted to the rider by the handlebar, and the sound caused by the impact further strengthens the warning. In a preferred embodiment, one warning apparatus 12 is respectively disposed inside the left and right handlebars of the bicycle. If a danger that a moving vehicle approaching in the left blind spot is detected, the warning apparatus 12 inside the left handlebar will give a warning. If a danger that a moving vehicle approaching in the right blind spot is detected, the warning apparatus 12 inside the right handlebar will give a warning.

Referring to FIGS. 3A and 3B, in some embodiments, one or more positions of the bicycle, such as the seat, seat tube (tube below the seat), left and right pedal shafts, and/or left and right cranks, are respectively provided with one warning apparatus 12. In some embodiments, in addition to respectively having one warning apparatus 12 inside the left and right handlebars of the bicycle, another warning apparatus 12 is respectively provided in each of the above-mentioned one or more positions to ensure that the rider can receive the warning. If the warning apparatus 12 is installed in the seat, the tube 121 of the warning apparatus 12 is an independent part. If the warning apparatus 12 is installed inside the seat tube, the left or right pedal shaft, or the left or right crank, the tube 121 of the warning apparatus 12 is a portion or a part of which.

Referring to FIGS. 3A and 3B, compared with the conventional warning apparatus in which a vibrating motor is arranged inside the handlebar, the warning apparatus 12 of the present application provides a better warning. As mentioned above, the vibrating motor of the conventional warning apparatus merely provides weak vibration through a single eccentric block. In addition, although the vibrating motor itself can also emit sound through the vibration of the eccentric block, the sound pressure is between 50 dB and 65 dB with frequency between 130 Hz and 180 Hz, which is difficult for the rider to hear outdoors. By contrast, in addition to the vibrating warning of the eccentric block, the warning apparatus 12 of the present application further provides an impact warning and an audible warning generated by the impact block 1222 hitting the inner wall 1211 of the tube 121. The rider's body parts, such as hands, buttocks, and/or feet, feel the impact force conducted by the tube 121. In a typical embodiment, the sound generated by the warning apparatus 12 has a sound pressure between 75 dB and 100 dB outdoors and a frequency between 1800 Hz and 3800 Hz. Therefore, the rider can easily hear the sound generated by the warning apparatus 12.

Figure 4A:
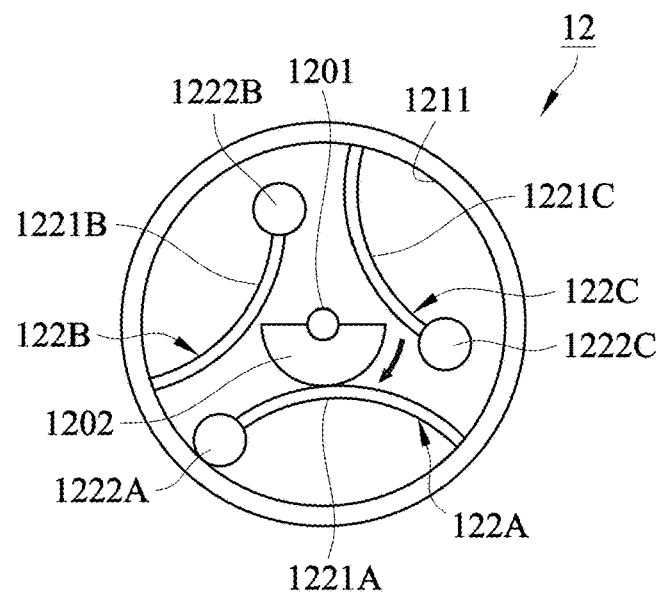
FIGS. 4A to 4C are schematic diagrams showing a warning apparatus according to another embodiment of the present invention.
Figure 4B:
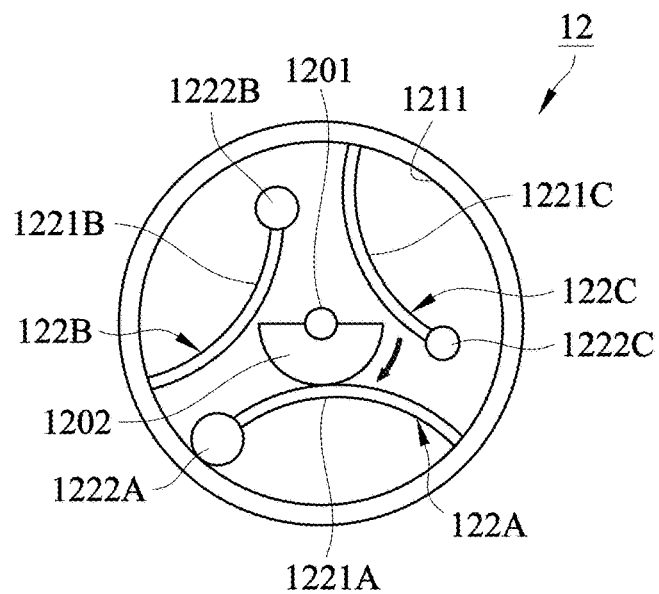
Figure 4C:
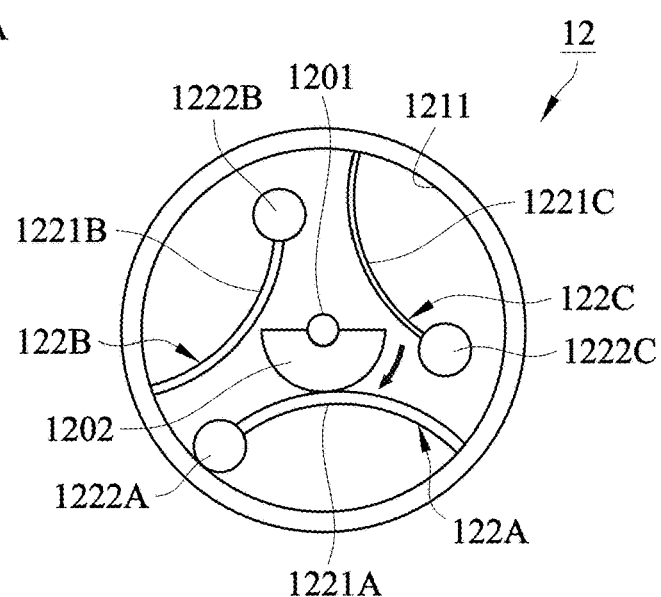

FIG. 4A is a schematic diagram showing a warning apparatus 12 according to another embodiment of the present invention. The difference between the exemplary embodiment and the embodiment shown in FIGS. 3A and 3B is that there are multiple impact sounders 122. For example, FIG. 4A shows that the warning apparatus 12 includes an impact sounder 122A, an impact sounder 122B, and an impact sounder 122C. When the rotary shaft 1201 rotates to drive the eccentric block 1202 to rotate, the eccentric block 1202 hits and then deforms the elastic members 1221A, 1221B, 1221C in sequence, such that the impact blocks 1222A, 1222B, 1222C hit the inner wall 1211 of the tube 121 in sequence and thereby generate an impact force and a continuous sound. In some embodiments, the sizes of the impact blocks 1222 and/or the elastic members 1221 of the impact sounders 122 are different from one another and may be arranged according to the order of impact. For example, in the example shown in FIG. 4B, the impact blocks 1222A, 1222B, and 1222C are all steel balls having diameters with relationship 1222A>1222B>1222C (or 1222A<1222B<1222C). In the embodiment of FIG. 4C, the elastic members 1221A, 1221B, and 1221C are spring clips having thicknesses or widths with relationship 1221A>1221B>1221C (or 1221A<1221B<1221C). Compared with the embodiment shown in FIGS. 3A and 3B, the sounds generated by the plurality of impact sounders 122 in the exemplary embodiment can be continuous, multi-frequency, and/or variable.

Figure 5A:
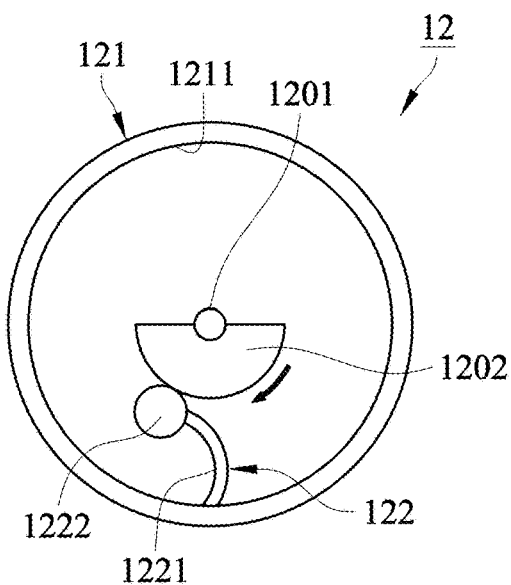
FIGS. 5A to 5C are schematic diagrams showing a warning apparatus according to another embodiment of the present invention.
Figure 5B:
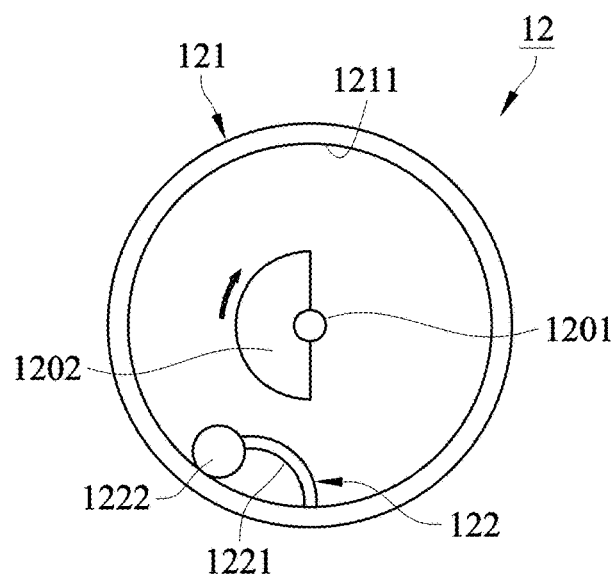

FIGS. 5A and 5B are schematic diagrams showing a warning apparatus 12 according to another embodiment of the present invention. In the exemplary embodiment, the warning apparatus 12 includes a vibrating motor 120, a tube 121, and an impact sounder 122. The configuration of the impact sounder 122 differs from that of the embodiment shown in FIGS. 3A and 3B. Referring to FIG. 5A, when the rotary shaft 1201 rotates to drive the eccentric block 1202 to rotate, the eccentric block 1202 hits the impact block 1222 to generate a first sound and deform the elastic member 1221. As shown in FIG. 5B, next, the deformed elastic member 1221 causes the impact block 1222 to impact the inner wall 1211 of the tube 121, which then generates an impact force and emits a second sound.

Figure 5C:
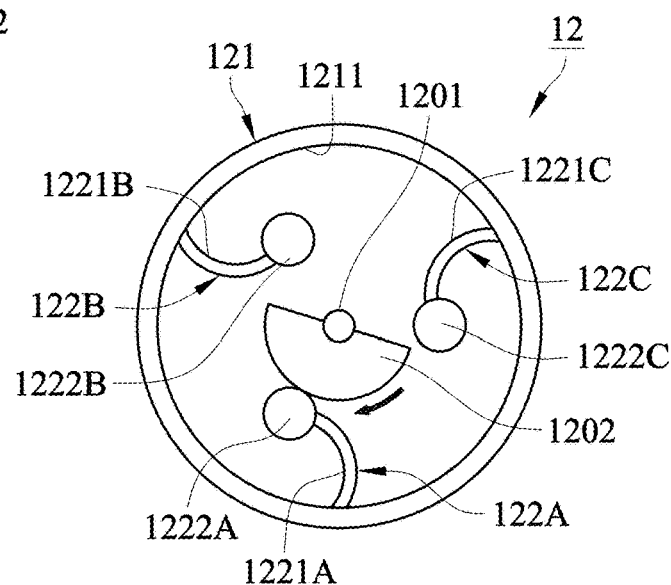

FIG. 5C is a schematic diagram showing a warning apparatus 12 according to another embodiment of the invention. The difference from the embodiment shown in FIGS. 5A and 5B is that the warning apparatus 12 includes two or more impact sounders 122—e.g.: an impact sounder 122A, an impact sounder 122B, and an impact sounder 122C. When the rotary shaft 1201 rotates to drive the eccentric block 1202 to rotate, the eccentric block 1202 hits the impact blocks 1222A, 1222B, 1222C to generate a first sound and deform the elastic members 1221A, 1221B, 1221C in sequence. Then the deformed elastic members 1221A, 1221B, 1221C cause the impact blocks 1222A, 1222B, 1222C to impact the inner wall 1211 and thereby generate an impact force and emit a second sound in sequence.

Referring to FIG. 5C, in the exemplary embodiment, dimensions of the impact blocks 1222 and dimensions of the elastic members 1221 of the impact sounders 122 are the same. In some embodiments, dimensions of the impact blocks 1222 and/or dimensions of the elastic members 1221 of the impact sounders 122 are different from one another and can be arranged according to the order of impact. For example, in the example of FIG. 5C, the impact blocks 1222A, 1222B, and 1222C are all steel balls having diameters with relationship 1222A>1222B>1222C or 1222A<1222B<1222C. The sound produced by the impact sounders 122 may be continuous, multi-frequency, and/or variable.

Figure 6:
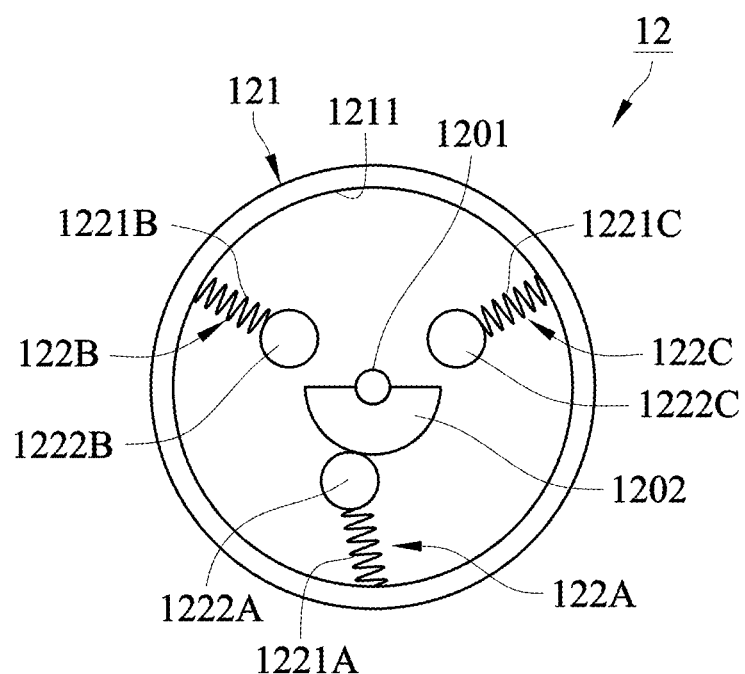
FIG. 6 is a schematic diagram showing a warning apparatus according to another embodiment of the invention.

FIG. 6 is a schematic diagram showing a warning apparatus 12 according to another embodiment of the present invention. In the exemplary embodiment, the warning apparatus 12 includes a vibrating motor 120, a tube 121, and one or more impact sounders 122—e.g.: an impact sounder 122A, an impact sounder 122B, and an impact sounder 122C. The difference from the exemplary embodiment and the embodiment shown in FIG. 5C is that the elastic members 1221A, 1221B, and 1221C are all springs. When the rotary shaft 1201 rotates to drive the eccentric block 1202 to rotate, the eccentric block 1202 hits the impact blocks 1222A, 1222B, 1222C to generate a first sound and deform the elastic members 1221A, 1221B, 1221C in sequence. Then the deformed elastic members 1221A, 1221B, 1221C cause the impact blocks 1222A, 1222B, 1222C to impact the inner wall 1211 and thereby generate an impact force and emit a second sound in sequence.

Referring to FIG. 6, in the exemplary embodiment, dimensions of the impact blocks 1222 and dimensions of the elastic members 1221 of the impact sounders 122 are the same. In some embodiments, dimensions of the impact blocks 1222 and/or dimensions of the elastic members 1221 of the impact sounders 122 are different from one another and can be arranged according to the order of impact. For example, in the example of FIG. 6, the impact blocks 1222A, 1222B, and 1222C are all steel balls having diameters with relationship 1222A>1222B>1222C or 1222A<1222B<1222C. The sound produced by the impact sounders 122 may be continuous, multi-frequency, and/or variable.

Figure 7:
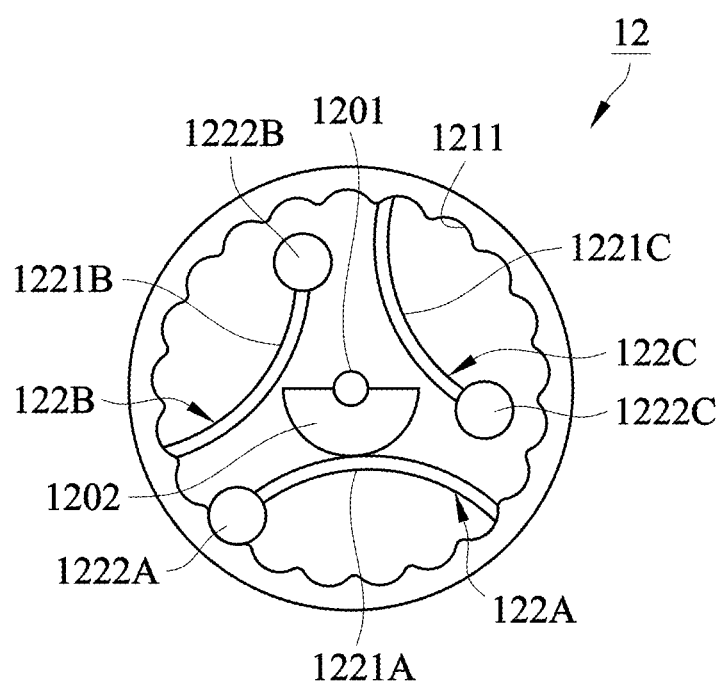
FIG. 7 is a schematic diagram showing a warning apparatus according to another embodiment of the invention.

FIG. 7 is a schematic diagram showing a warning apparatus 12 according to another embodiment of the present invention. The difference between this exemplary embodiment and the embodiment shown in FIG. 4A is that the inner wall 1211 of the tube 121 is not smooth but roughened. The roughened inner wall 1211 increases the intensity of impact. The roughened inner wall 1211 may also be applied to any embodiment of the present application, such as embodiments shown in FIGS. 3A and 3B, FIGS. 4B and 4C, FIGS. 5A to 5C, and FIG. 6.

Figure 8:
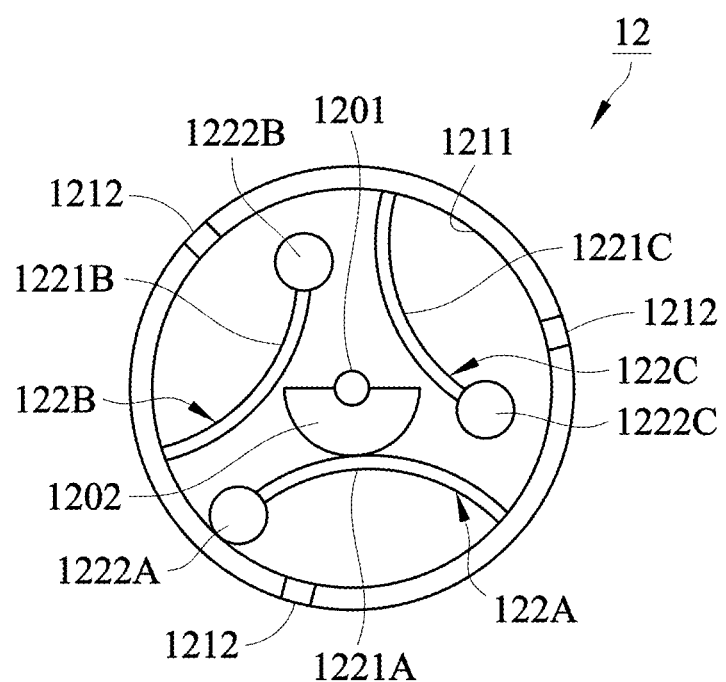
FIG. 8 is a schematic diagram showing a warning apparatus according to another embodiment of the invention.

FIG. 8 is a schematic diagram showing a warning apparatus 12 according to another embodiment of the invention. The difference between this embodiment and the embodiment shown in FIG. 4A is that the tube 121 includes one or more perforations 1212 to increase the sound pressure and/or alter of the sound emitted by the tube 121. The tube 121 having the perforations 1212 can also be applied to any embodiment of the present application, such as the embodiments shown in FIGS. 3A and 3B, FIGS. 4B and 4C, FIGS. 5A to 5C, and FIG. 7.

Figure 9:
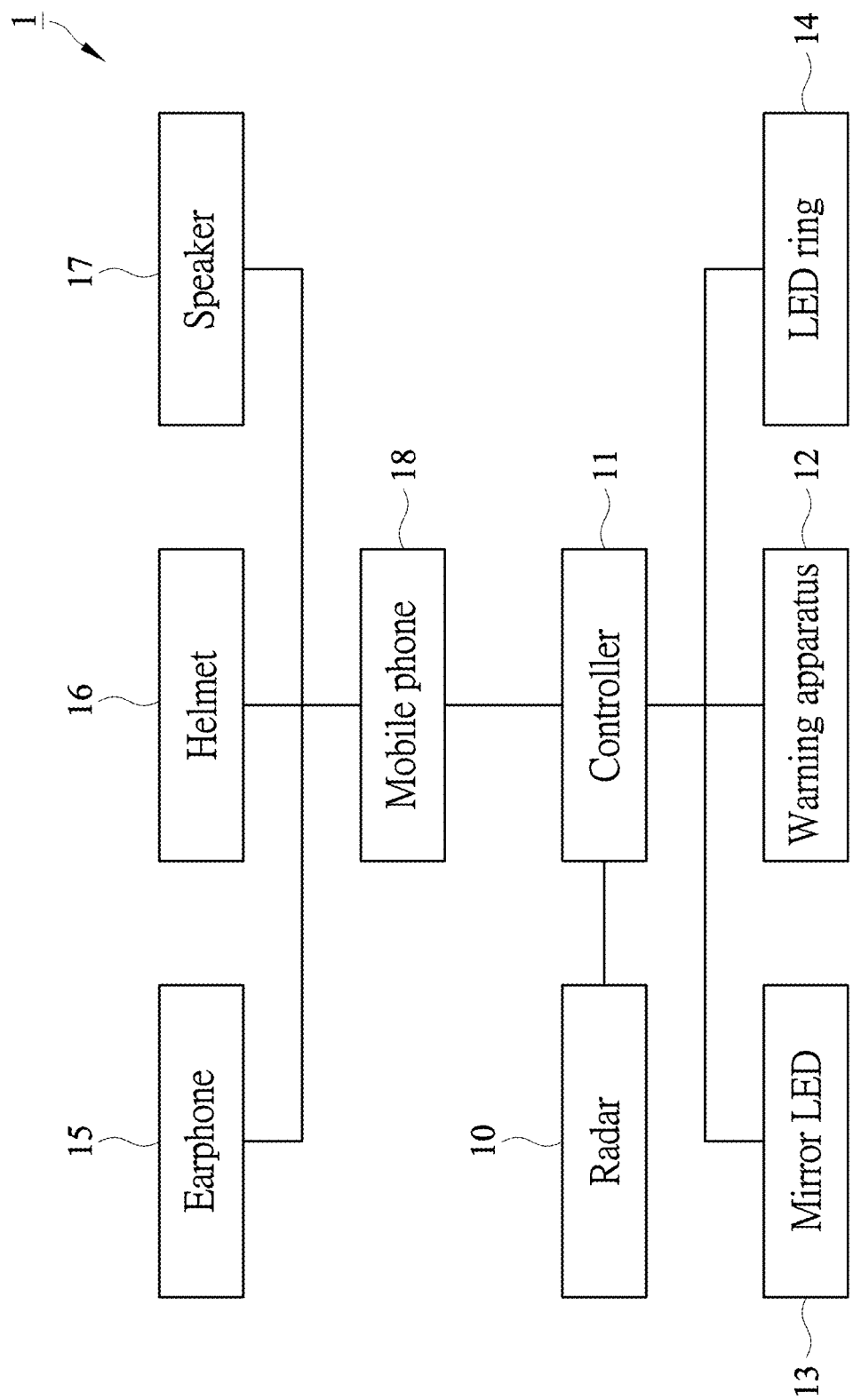
FIG. 9 is a block diagram showing a bicycle safety system in accordance with an embodiment of the invention.

FIG. 9 is a block diagram showing a bicycle safety system 1 according to another embodiment of the invention. The difference from the system shown in FIG. 1 is that the controller 11 may connect to other devices in a wired or wireless manner to provide auxiliary warnings to the rider. For example, the bicycle safety system 1 further includes a mirror LED 13 respectively mounted on left and right rearview mirrors and/or a LED ring 14 respectively mounted on left and right handlebars. The controller 11 connects to the left and right mirror LED 13 and/or the left and right LED rings 14 through wires. When a danger is detected, the controller 11 drives the left or right mirror LED 13 and/or LED ring 14, corresponding to the left or right blind spot that the danger is detected, to emit a light. And the color or intensity of the emitted light may be different for different waring levels. In addition, the mirror LED 13 installed on the left and right rearview mirrors may include a plurality of LEDs (light-emitting diodes) surrounding the periphery of the rearview mirror, and these LEDs may emit light in sequence, for example, in a clockwise or counterclockwise order to strengthen the warning. Similarly, the LED ring 14 may emit different colors for different warning levels.

Referring to FIG. 9, the controller 11 may further include a Bluetooth communication module to wirelessly connect to the rider's mobile phone 18 and transmit information to an application (APP) of the mobile phone 18. The transmitted information may include warning messages and other information, such as maps, real-time images behind the bicycle, and text/symbols/graphics/voice prompts, etc.

Figure 10:
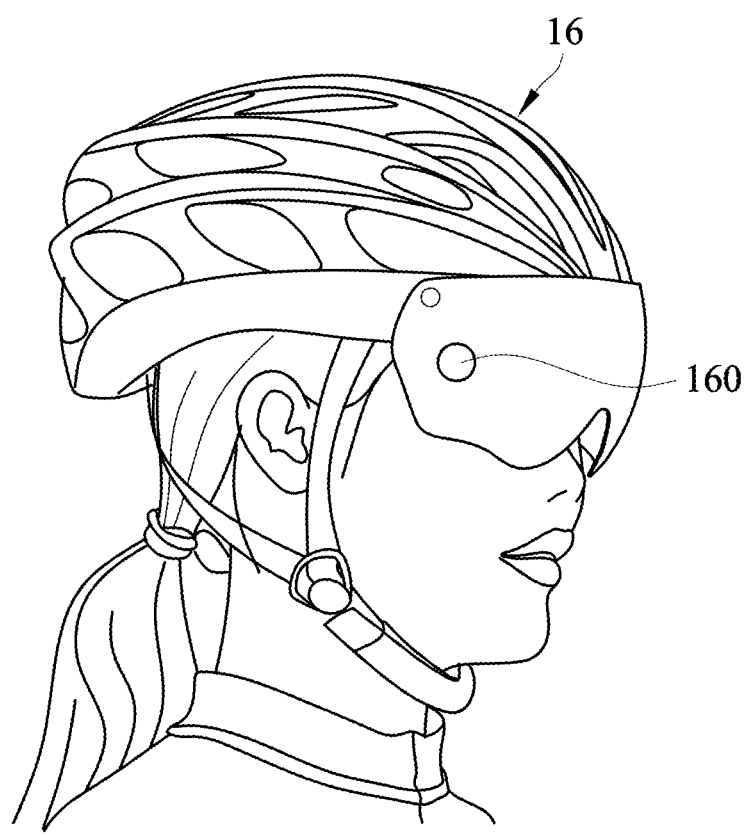
FIG. 10 shows a helmet of the bicycle safety system in accordance with an embodiment of the invention.

Referring to FIG. 9, via Bluetooth communication, the rider's mobile phone 18 may connect to one or more other devices—e.g.: an earphone 15, a helmet 16, and/or a speaker 17—to provide additional warning or warning messages to the rider. For example, a prompt voice is transmitted to the earphone 15, the helmet 16, and/or the speaker 17 via Bluetooth communication. FIG. 10 shows the helmet 16 according to an embodiment of the present invention. The helmet 16 includes a built-in Bluetooth headset and/or a Bluetooth speaker (not shown) to receive warning messages from the mobile phone 18. In addition, the helmet 16 includes a LED light 160 respectively arranged on both sides of a mask. The LED light 160, at the side corresponding to the blind spot that the danger is detected, will emit a light, and the color and/or intensity of the emitted light may be different for different waring levels.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques.

What is claimed is:

1. A bicycle safety system, comprising:
a radar for detecting a signal of one or more vehicles in a left blind spot and a right blind spot behind a bicycle;
a controller for receiving the signal from the radar and determining whether to issue a warning based on the signal; and
a warning apparatus, comprising;
a tube;
a vibrating motor comprising a rotary shaft and an eccentric block connected to the rotary shaft, wherein the rotary shaft and the eccentric block are arranged inside the tube; and
an impact sounder comprising an elastic member and an impact block, wherein the elastic member comprises a first end fixed to an inner wall of the tube and a second end connected to the impact block;
wherein the controller outputs a control signal to drive the rotary shaft to rotate if the warning is needed to issue, the rotation of the rotary shaft drives the eccentric block to rotate and result in vibration, and the eccentric block hits the impact sounder, causing the impact block to hit the inner wall and thus create an impact force and emit a sound.

2. The bicycle safety system according to claim 1, wherein one or more positions of the bicycle, comprising one or more of a seat, a seat tube, a left pedal shaft, a right pedal shaft, a left crank, and a right crank of the bicycle, are respectively provided with one warning apparatus.

3. The bicycle safety system according to claim 1, wherein the eccentric block hits and deforms the elastic member of the impact sounder, and the deformed elastic member causes the impact block to hit the inner wall to create the impact force and emit the sound.

4. The bicycle safety system according to claim 1, wherein the eccentric block hits the impact block of the impact sounder and thus emits a first sound and deforms the elastic member, and the deformed elastic member causes the impact block to hit the inner wall to create the impact force and emit a second sound.

5. The bicycle safety system according to claim 1, wherein the impact sounder comprises a plurality of impact sounders.

6. The bicycle safety system according to claim 5, dimensions of the impact blocks and/or dimensions of the elastic members of the plurality of impact sounders are different from one another.

7. The bicycle safety system according to claim 1, wherein the elastic member is a spring clip.

8. The bicycle safety system according to claim 1, wherein the impact sounder is a steel ball.

9. The bicycle safety system according to claim 1, wherein the inner wall comprises a rough surface.

10. The bicycle safety system according to claim 1, wherein the tube comprises one or more perforations.

* * * * *